United States Patent [19]

Walker

[11] 4,170,197
[45] Oct. 9, 1979

[54] METHOD OF RAISING OYSTERS
[75] Inventor: Ian M. Walker, Madbury, N.H.
[73] Assignee: Spinney Creek Oyster Company, Eliot, Me.
[21] Appl. No.: 843,889
[22] Filed: Oct. 20, 1977
[51] Int. Cl.$^2$ .............................................. A01K 61/00
[52] U.S. Cl. .......................................................... 119/4
[58] Field of Search ........................................ 119/4, 2, 3

[56] References Cited
U.S. PATENT DOCUMENTS

| | | | |
|---|---|---|---|
| 3,650,244 | 3/1972 | Fordham | 119/4 |
| 3,766,888 | 10/1973 | Wiegardt, Jr. | 119/4 |
| 3,779,209 | 12/1973 | Budge et al. | 119/4 |
| 3,909,971 | 10/1975 | Wilde | 119/4 X |
| 3,996,894 | 12/1976 | Wiegardt, Jr. | 119/4 |

Primary Examiner—Hugh R. Chamblee
Attorney, Agent, or Firm—Lee A. Strimbeck

[57] ABSTRACT

Marine shellfish, such as bivalve mollusks, are grown to edible size in surface-floating, partly submerged trays comprising a frame enclosed with a mesh having a size small enough to retain the species to be grown. A plurality of these trays are connected together in series and anchored in nutrient-providing water, such as an estuary, that while protected nonetheless is subject to wave action. These trays are attended by periodically flipping them over every two to three days and, if necessary, removing any fouling that may have built up on the undersurface. By means of this system, marketable-size oysters can, for example, be produced in fourteen months compared to the twenty-two to forty-eight months of other methods. This method has many advantages among which are: self-cleaning due to wave action; the flipping permits sunlight to kill fouling organisms on the outer surfaces; the constant agitation provides more equality in feeding of the infants and juveniles and tends to prevent attachment of the shellfish to the tray and/or to each other; the shellfish are at the surface which has the highest amount of algae and most reduced amount of the larval stages of fouling marine animals, which prefer less light; daily temperature differences stimulate feeding; etc.

5 Claims, 2 Drawing Figures

METHOD OF RAISING OYSTERS

With the decrease of water temperatures over the eons and with the more recent man-caused pollution of coastal waters, it has become almost impossible for oysters and like shellfish to breed in northern coastal waters, such as those along the Maine coast. This present invention is concerned with a method of growing shellfish and especially bivalve mollusks, such as oysters—American and European, in coastal salt water, such as in the semi-protected bays and estuaries of the Maine coast. The system of this invention permits juvenile oysters or spat to be grown to marketable-size adults in as little as one half of the time as other methods of culturing of the same species. The method of this invention is also suitable for the rapid growth of bay scallops and hard shell clams (quahogs).

The system of the present invention uses a flippable, semi-submerged floating tray to carry and confine the growing marine shellfish from their infantil stages (600–700 microns) to marketable-size adults. This tray is quite simple comprising, for example, a floatable rectangular framework, such as of logs or polyvinyl chloride tubing. The top and bottom of the framework are covered with a mesh preferably of a plastic such as nylon and of a small enough size to contain the species being grown. The infant shellfish can be allowed to attach to larger size grit, crushed shells or the like to aid their retention in the trays.

The floating trays upon being stocked with the shellfish are tied to each other to form a continuous line of trays. This line of trays is then secured at either end by anchors. Tending of the trays during the growing stage consists of flipping them every two to three days and brushing the plastic mesh as necessary to prevent fouling by various flora and fauna.

The present floating tray method of raising shellfish has many advantages. It drastically reduces the infestation of marine boring worms and sea squirts. It eliminates fouling problems of seaweeds and grasses. Preferably the trays are anchored in a water that is subject to some decided wave action such that the trays are constantly agitated thus causing the juveniles to be shifted about and reducing the differential in food distribution in any one tray. Some oyster spat, for example *C. virginica,* tend to reattach to each other. The effect of the continuous wave action permitted by this invention eliminates this from happening, which is a decided advantage. It is also found that the variations in the surface temperature of the water from day to night stimulates the shellfish into more active feeding such that the rate of growth is greatly increased. The shellfish in the trays are, of course, in a water stratum that contains the highest amount of food, e.g. algae, and the least amount of fouling organisms, as most larval stages of marine animals prefer a lower light intensity than that which is found on the surface. Also, the exposure upon the turning of a tray of what was the undersurface of the tray to sunlight helps kill the larval stages of any fouling organisms that may have attached to the bottom mesh.

The turning of the trays every two or three days also has the advantage of permitting visual inspection of the stock to assure that all is in good order.

Cultivation of oysters in the manner of this invention in the mouth of the Piscataqua River in Maine has shown that the present floating-flipping tray system greatly increases the rate of growth of the shellfish at all ages. Marketable-size adults, having a weight of well over a 1000-fold more than the average weight of the original spat, are produced in fourteen or less months whereas other methods of culturing require twenty-two to forty-eight months for the same species to produce the same size or yield.

THE DRAWINGS

DESCRIPTION

Figure 1:
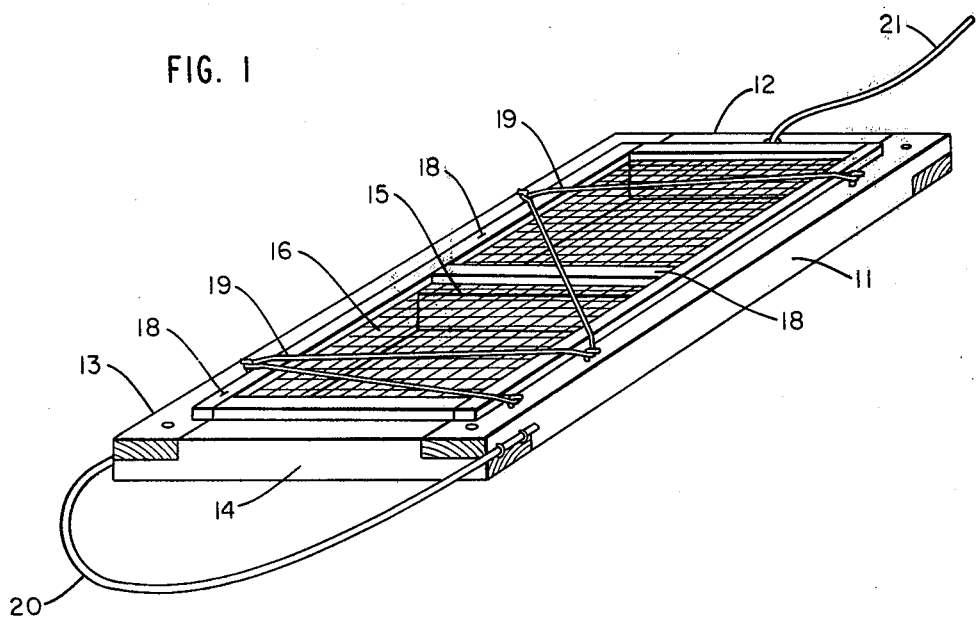
FIG. 1 is a perspective view of one type of tray suitable for use in the method of this invention.

Referring to FIG. 1, a single tray can consist, for example, of some floatable material such as five pieces of 4×4 inch timber—11, 12, 13, 14 and 15—suitable joined as by lapping and pinning to form a divided hollow rectangle. This can have, for example, an overall size of 3×6 feet. The open spaces are then covered top and bottom with screen 16 which may be of a fiber, metal or plastic mesh, preferably the latter, e.g. polypropylene filaments. If the size of the mesh is 1×1 millimeters, it will support oyster spat of about 1.5 millimeters and larger in size. The mesh is preferably mounted on its own framework 18 which may be of lath or metal strap such that it can be mounted to the timbers and then removed to permit access to the stock. One method of mounting can be to use shock cord 19 hooked over the frame 18 as illustrated. Alternatively, the frame 18 can be mounted to the timbers with wing nuts and bolts.

Of course, a nonfloating frame with suitable attached flotation cells can be used to make a tray if desired. Water-logged frames can also have additional flotation provided. The frame can have a width of 1 to 4 feet, a length of 2 to 7 feet, and a thickness in the range of 1 to 6 inches.

Each tray as illustrated is equipped with a bridle 20 at one end and a piece of line 21 at the other end.

Figure 2:
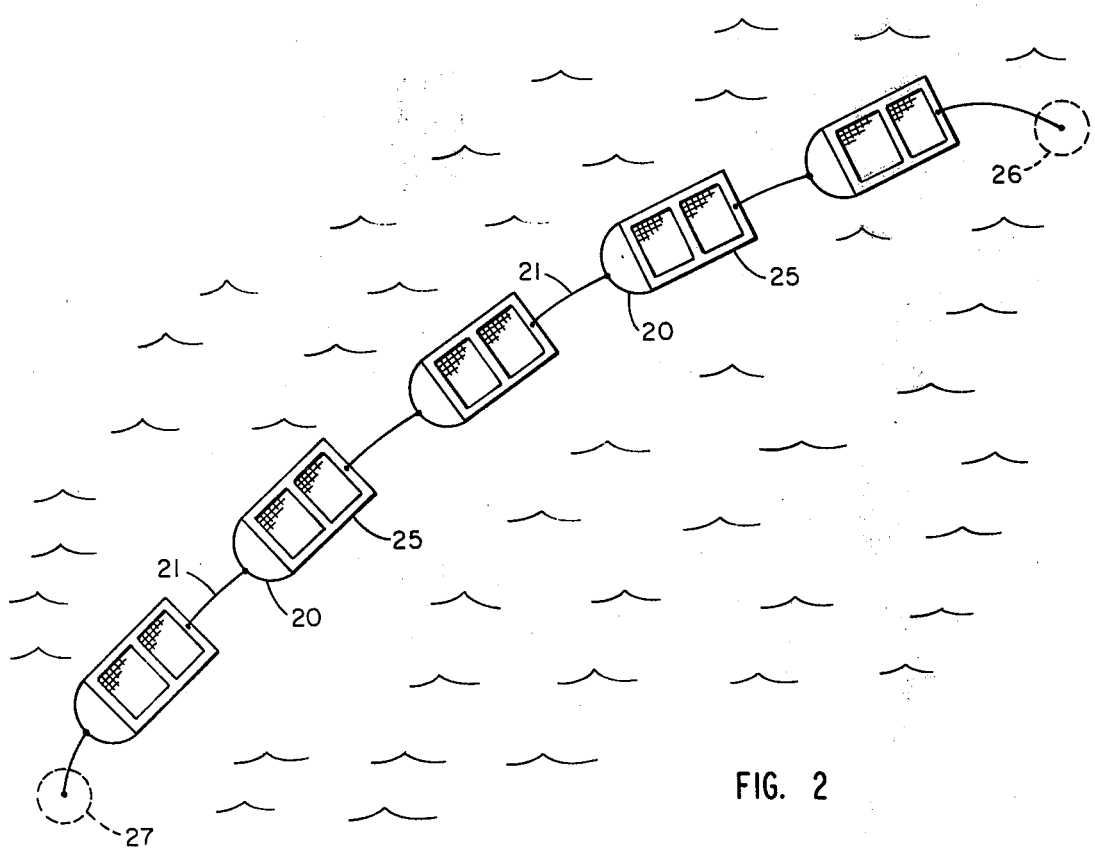
FIG. 2 is a bird's eye view of a series of trays anchored in a suitable waterway such that they can be exposed to the flow of nutrients and to wave action.

Referring to FIG. 2 shown is a series of trays 25 with their bridles 20 and lines 21 connected and placed in suitable waters with the ends thereof anchored at 26 and 27 to hold the trays in place.

As an example each tray can be loaded with 10,000 to 20,000 spat. It is preferred to start a growing cycle during the months of May to August for Maine coastal waters. The trays are then joined as shown in FIG. 2 and allowed to float in the water being subjected to the natural wave action and the tidal flow. Every two or three days and preferably at least once every 120 hours a tender flips each tray over. This flipping has the advantages previously noted of permitting removal or elimination of fouling organisms and permitting in the case of wood structures the exposed surface to dry and increasing the useful period of flotation. Depending upon, inter alia, the amount of nutrients available in the water and the temperature, this process continues for a period of ten to twenty months until the oysters reach a marketable size of 10 centimeters or so. For a tray having a dimension of about 3 feet×6 feet×4 inches the weight of the oysters therein will have increased from about 20 grams to about 48 kilograms or more.

What is claimed is:

1. A method of growing marine shellfish comprising (a) providing a surface-floating, partly submerged tray defined by a rectangular framework of floatable material having a predetermined thickness and enclosed on top and bottom sides with a mesh having a size sufficient to retain a species of shellfish with said framework to be grown therein;

(b) inserting a multiplicity of infants of said species into said tray;

(c) floating said tray on a body of water providing nutrients for said species and being subject to wave action;

(d) maintaining said tray in said water continuously for a period of time sufficient to achieve at least a 1000-fold weight gain in said species;.

(e) periodically turning over said tray during said sustained period; and (f) recovering as product after said sustained period of time said species so grown.

2. The method of claim 1 wherein said period of time is at least six months and said tray is fairly consistently turned over at least once within every 120 hours.

3. The method of claim 1 when a plurality of said trays are attached in series and anchored at the ends of said series in a protected coastal body of salt water.

4. The method of claim 1 when said infants are spat and said product is a marketable-size oyster.

5. The method of claim 1 when said trays have a width in the range of 1 to 4 feet, a length in the range of 2 to 7 feet, and a thickness in the range of 1 to 6 inches.

* * * * *